July 1, 1947. J. HANDLEY 2,423,100
ELECTROSTATIC POTENTIAL MEASURING INSTRUMENT
Filed Feb. 27, 1943
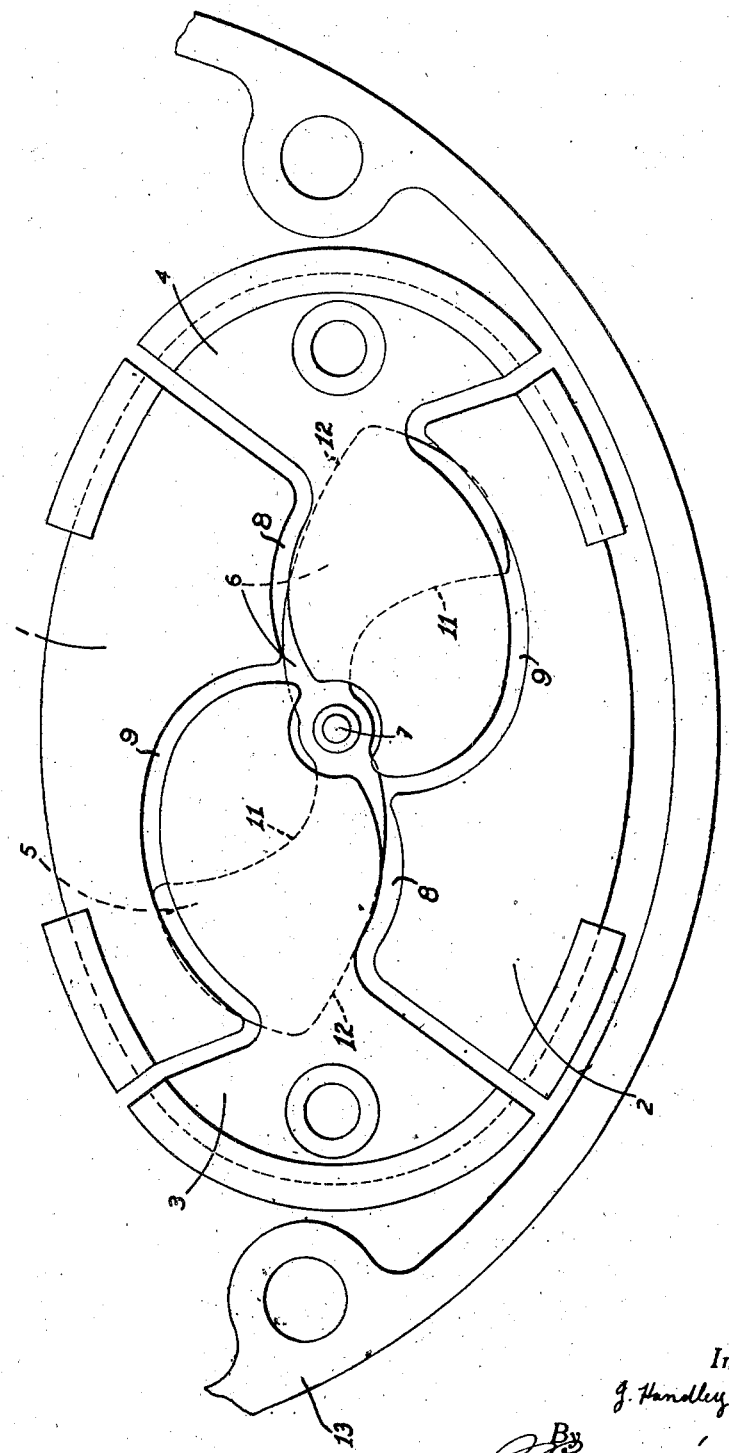
Inventor
J. Handley.
By
Attorney Patented July 1, 1947

2,423,100

UNITED STATES PATENT OFFICE 2,423,100

ELECTROSTATIC POTENTIAL MEASURING INSTRUMENT

John Handley, London W. C. 2, England, assignor to Standard Telephones and Cables, Limited, London, England, a British company Application February 27, 1943, Serial No. 477,406
In Great Britain May 11, 1942

7 Claims. (Cl. 171—95)

The invention refers to electrostatic voltmeters of the quadrant type.

One object of the invention is to control the "law" of the instrument, i. e. the relationship between the voltage being measured and the deflection produced thereby. Instruments of this type hitherto have operated according to a "square law," the developed torque being proportional to the square of the voltage. Obviously the law of the instrument determines the calibration of the scale over which moves the indicating pointer, and it is possible by means of the present invention to obtain an evenly graduated scale instead of the normal logarithmic scale. It is also possible to give an increased angular range of pointer travel.

These objects are attained by suitable shaping of the appropriate edges of the stator and/or rotor plates, namely the edges that extend in the generally radial direction or, otherwise expressed, the edges that determine the amount of superficial overlap, for any one angular position of the rotor, betwen a rotor plate and the quadrantal stator plates. Such shaping involves a departure from the strictly radial, so that, in the case for instance of two adjacent stator plates, the slot between them may be described as spiral as distinct from radial.

A desirable embodiment of the features of the invention is shown in the accompanying drawing, showing a front view of the quadrantal stator blades and cooperating armature vanes.

The features of the present invention are directed to an improved configuration or contour and relative arrangement of the electro-responsive torque-producing elements for actuating the pointer of a measuring instrument of the general type referred to. As shown in the drawing, the stator elements are of the quadrant type, four quadrants being arranged in one plane, composed of a pair of attracting blades or quadrants 1 and 2 in quadrature position to a pair of repelling quadrant blades 3 and 4. Parallel and close to the stator plane is the rotor plane in which a suitably journalled rotor or armature 5, 6 is mounted on a spindle 7 to be rotated relative and parallel to the two pairs of quadrant blades 1, 2 and 3, 4.

Attracting and repelling stator quadrants 1, 2 and 3, 4, respectively, are separated by spiral slits 8, 9 originating near the axis of rotation and extending towards the periphery of the effective surface of the stator blades. The armature consists of two vanes 5, 6 which are arranged diametrically with respect to the axis of rotation. Each of these vanes is of a spiral shape similar to that of spiral slits. Their leading edges 11 are slightly more curved, and their trailing edges 12 are slightly less curved, than slit 8 so that the medium curvature of each vane approximately corresponds to that of slit 8. The area of each vane is relatively narrow near the axis of rotation and gradually broadens when approaching the periphery.

The relative angular position or relation of the spiral edges of vanes 5, 6 is such that the point at which an armature vane, for example 5, enters an attracting quadrant, for example 1, progressively near the center or axis of rotation as the armature or pointer attached thereto is rotated clockwise under the influence of the electrostatic forces exerted by the stator quadrants upon the rotor vanes. The effect of the angular position of the spiral edges is to reduce the increment in torque as the deflection increases and, also, to produce an increased angular movement of the pointer. Since the rotor vanes are tapered down from the outside towards the center, the increment in torque with increasing angle of rotation is further reduced by reducing the rate of change of capacity.

As illustrated in the drawing, the electric voltmeter is enclosed in a casing, the base plate of which is indicated at 13. Plate 13 supports quadrantal stator blades 1, 2 and 3, 4 as well as spindle 7 in their proper positions. Under the influence of electrostatic forces exerted by the blades 1, 2 and 3, 4 on vanes 5, 6, the spindle is rotated and the force can be measured in the usual manner by causing the spindle to rotate against the force of a calibrated spring. By means of a pointer attached to the spindle, the amount of rotation and thereby the voltage is evaluated.

What is claimed is:

1. In an electrostatic voltmeter of the quadrantal type, means for producing a substantially linear relation between exciting voltage and indicating torque, two oppositely polarized pairs of stator blades arranged in one plane in a generally quadrature position around a center, said pairs being co-extensive in a radial plane for a major portion of their length and being separated from each other by slits of two curvature types extending spirally each in reverse curvature from the center to the periphery of the stator blades, a rotor blade arranged rotatably about an axis through said center in a plane parallel to the stator plane, said rotor blade comprising vanes extending spirally from said axis of rotation in a direction substantially similar to that of one type of the slits.

2. A voltmeter according to claim 1, wherein the quadrants of one pair are arranged side by side, each being separated from the quadrants of the other pair by two spiral slits of opposite curvature.

3. A voltmeter according to claim 1, wherein the rotor comprises two vanes of identical shape arranged diametrically with respect to said axis of rotation.

4. A voltmeter according to claim 1, wherein the rotor comprises two vanes of identical shape arranged diametrically with respect to said axis of rotation, each vane being relatively narrow near the axis of rotation and gradually broadening towards the periphery, the arrangement of the combined electrostatic field thereby producing a long variable field in the direction of rotor travel, and a consequent wide angle of indication.

5. A voltmeter according to claim 1, wherein the rotor comprises two vanes of identical shape arranged diametrically with respect to said axis of rotation, each vane being relatively narrow near the axis of rotation and gradually broadening towards its periphery and each vane having a spiral leading edge of greater curvature and a spiral trailing edge of lesser curvature than that of one of the spiral slits.

6. A voltmeter according to claim 1, wherein the rotor comprises two vanes of identical shape arranged diametrically with respect to said axis of rotation, the other of said spiral slits extending in such a direction that with increasing angle of rotation, the point at which one of said vanes enters an attracting quadrant approaches said center for at least part of the angle of rotation.

7. A voltmeter according to claim 1, wherein the rotor comprises two vanes of identical shape arranged diametrically with respect to said axis of rotation, each vane being relatively narrow near the axis of rotation and gradually broadening towards its periphery for an angle of rotation of approximately 180°.

JOHN HANDLEY.

REFERENCES CITED

The following references are of record in the file of this patent:

UNITED STATES PATENTS

| Number | Name | Date |
| --- | --- | --- |
| 1,776,708 | St. Clair | Sept. 23, 1930 |
| 771,968 | Bowman | Oct. 11, 1904 |
| 1,210,609 | Davis | Jan. 2, 1917 |
| 637,785 | Hewlett | Nov. 28, 1899 |
| 574,739 | Kelly | Jan. 5, 1897 |
| 809,793 | Ferguson | Jan. 9, 1906 |
| 520,963 | Knowles | June 5, 1894 |
| 531,970 | Rowland | Jan. 1, 1895 |

FOREIGN PATENTS

| Number | Country | Date |
| --- | --- | --- |
| 400,653 | Great Britain | Oct. 3, 1933 |
| 154,298 | Germany | Oct. 13, 1904 |
| 333,786 | Germany | Mar. 3, 1921 |
| 6,894 | Great Britain | Mar. 30, 1899 |